April 2, 1935.  F. PUENING  1,996,651
COKING APPARATUS
Filed June 24, 1931  9 Sheets-Sheet 1

INVENTOR.
Franz Puening
BY
Jesse P. Langley
ATTORNEY

April 2, 1935.  F. PUENING  1,996,651
COKING APPARATUS
Filed June 24, 1931  9 Sheets-Sheet 4

INVENTOR.
Franz Puening.
BY Jesse G. Langley
ATTORNEY.

April 2, 1935.   F. PUENING   1,996,651
COKING APPARATUS
Filed June 24, 1931   9 Sheets-Sheet 5

INVENTOR.
Franz Puening
BY
Jesse R. Langley
ATTORNEY.

April 2, 1935.  F. PUENING  1,996,651
COKING APPARATUS
Filed June 24, 1931  9 Sheets-Sheet 6
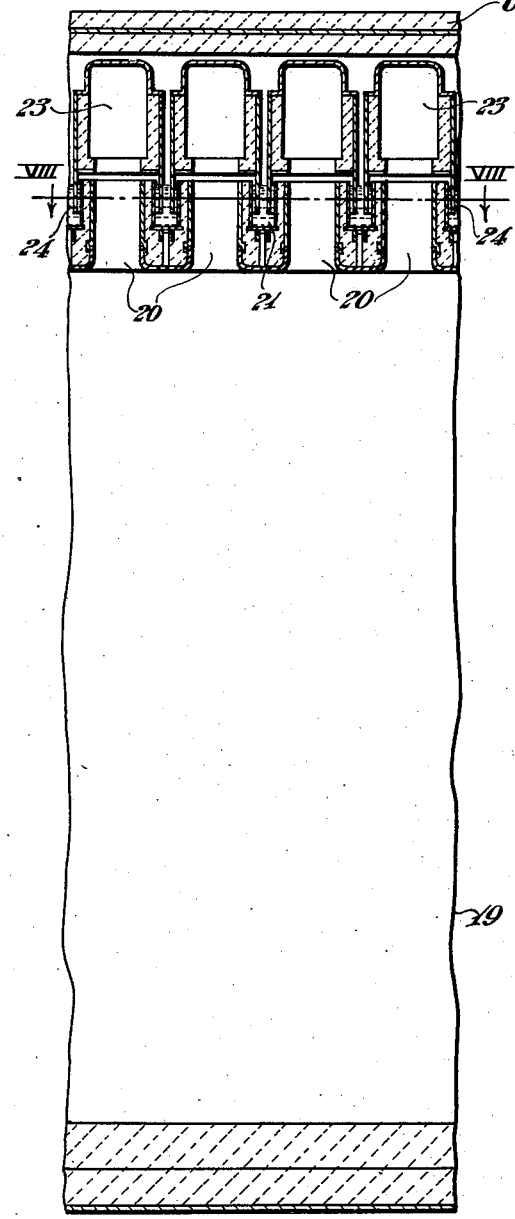
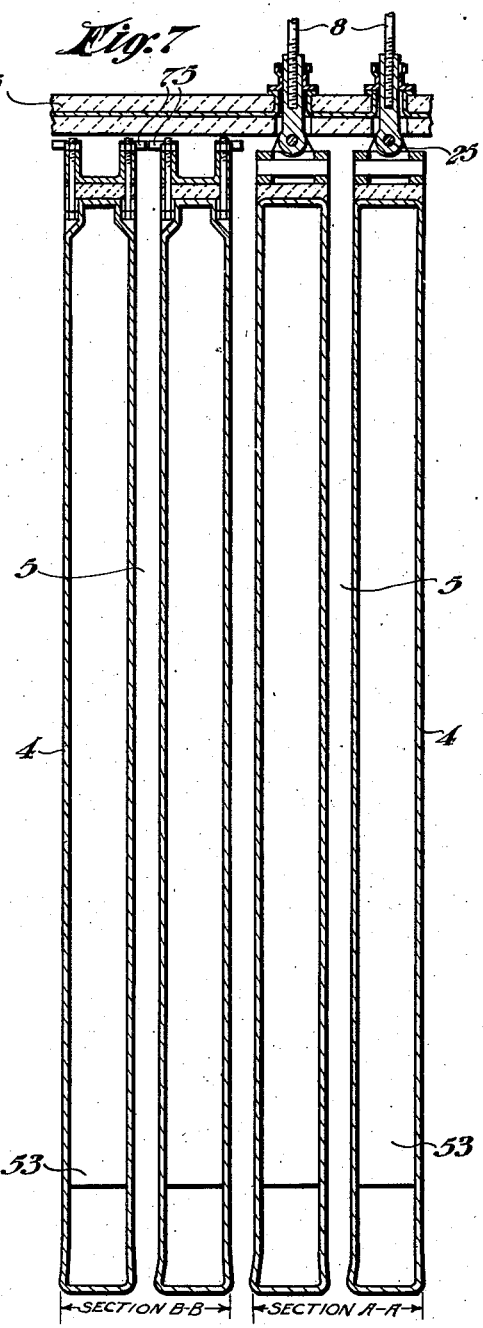
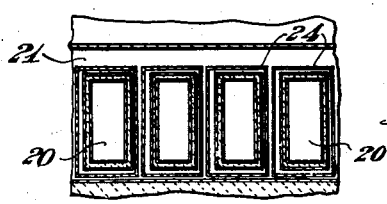
INVENTOR
Franz Puening.
BY Jesse R. Langley
ATTORNEY.

April 2, 1935.  F. PUENING  1,996,651
COKING APPARATUS
Filed June 24, 1931   9 Sheets-Sheet 7

INVENTOR.
Franz Puening.
BY Jesse R. Langley
ATTORNEY.

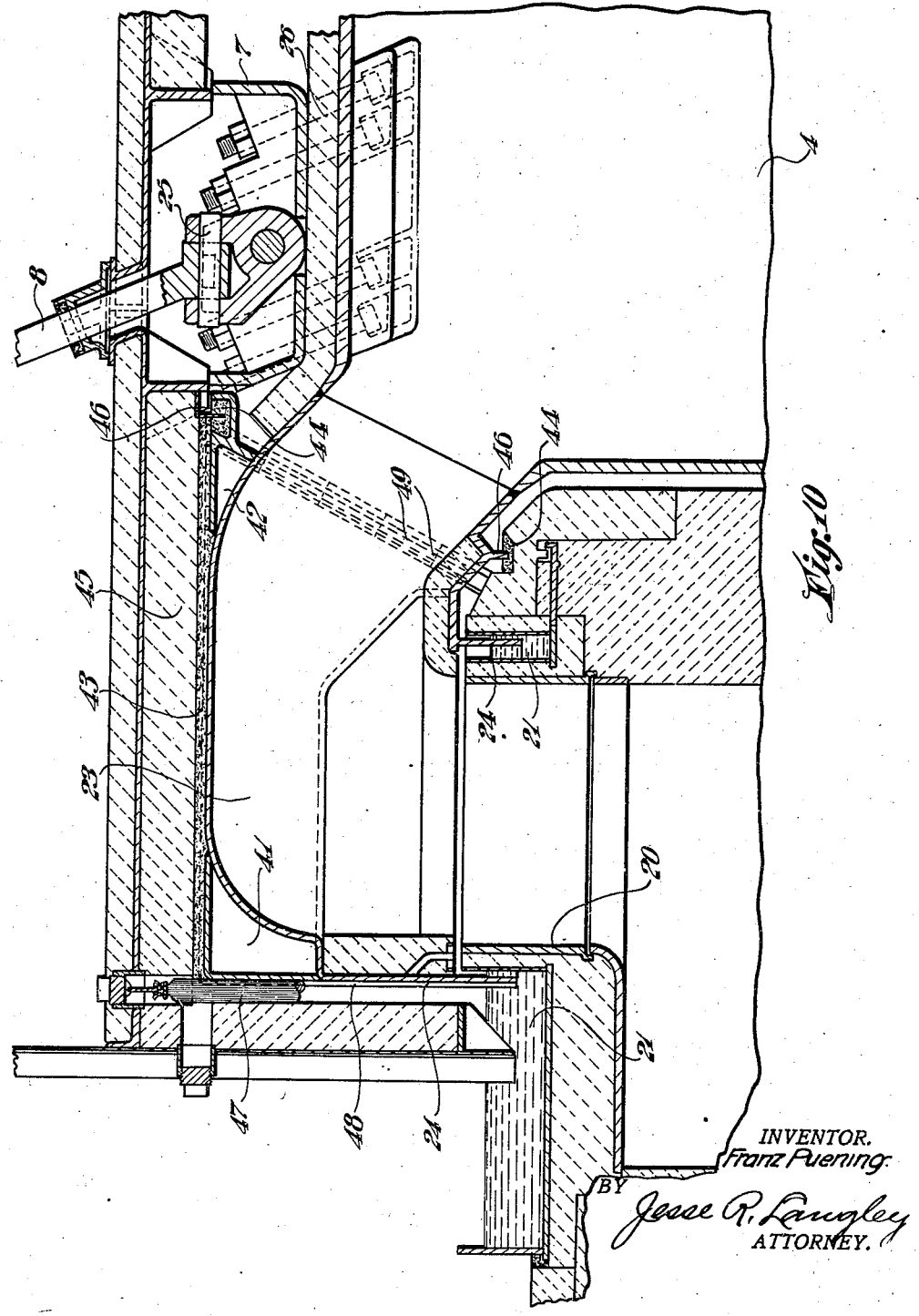

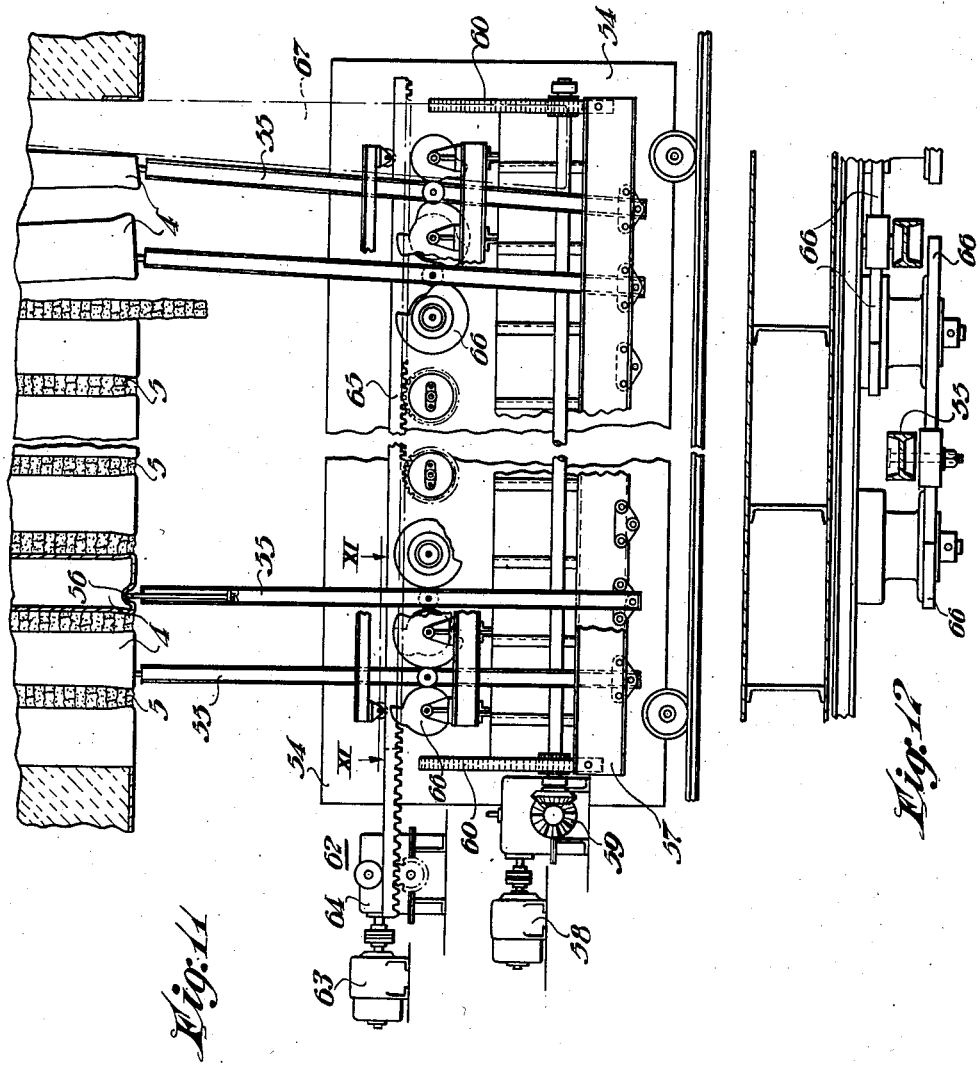

Patented Apr. 2, 1935

1,996,651

UNITED STATES PATENT OFFICE 1,996,651

COKING APPARATUS

Franz Puening, O'Hara Township, Allegheny County, Pa.

Application June 24, 1931, Serial No. 546,449

11 Claims. (Cl. 202—114)

My invention relates to coking apparatus and particularly to apparatus for the production of low-temperature coke.

The present invention is closely related to, and is an improvement upon, the subjects-matter of my copending applications Serial Nos. 339,521, filed Feb. 13, 1929 and 396,468, filed Oct. 1, 1929.

The present invention provides for the production of low-temperature coke by an economical process which comprises supplying to the coking apparatus a continuous uniform supply of heating gases at low or medium temperatures. The heat in these hot gases is then continually conveyed by convection and conduction to the coking surfaces in contact with the coal to be coked.

The apparatus of my invention is intended to obviate certain difficulties that have been previously encountered in the production of hard, dense low-temperature coke with respect to the discharge of the latter from the retorts in which it has been produced. The temperature of iron retorts for producing desired low-temperature coke should not exceed 1100° to 1200° F. and, at such temperatures, coke shrinks very little and is difficult to discharge from the retorts.

This difficulty is caused by reason of the fact that the material successively assumes a plastic condition and a rigid state after the plastic material has been forced into contact with the walls of the retort with considerable pressure and is molded into the irregularities of the retort walls.

In certain prior apparatus, heating walls have been movable in order to separate them for the removal of coke and considerable space has been required in order to provide for this movement. In these cases, the movement has been simultaneous or cumulative and the space required has been large in comparison with the relative movement of adjacent heating walls.

This additional and unoccupied space becomes filled with raw gas during the coking operation and upon opening of the apparatus for discharge of the coke, the gas with its valuable by-products has been wasted. Also, there is danger of explosion upon the mixture of a comparatively large quantity of highly heated combustible gas with the atmosphere when the retorts have been opened.

In the apparatus of the present invention, I provide an arrangement in which the heating walls are separately and successively movable relatively to each other in order to remove the coke therefrom and to replace them in position for receiving a charge of coal. The heating walls are surrounded by an enclosure in such manner as to provide a very compact structure with very little additional space to permit movement of the heating walls. The walls of the enclosure are also heated.

The greater portion of the additional space for moving the heating walls is occupied during the coking operation by what may be termed a "displacement body", which insures that this space will not be occupied by gases of distillation. This displacement body is partially removed prior to the discharge of the coke in order to permit relative movement of the heating walls.

The details of my invention will be described in connection with the accompanying drawings, in which Figure 1 is a vertical sectional view of apparatus constructed in accordance with my invention, taken on line I—I of Fig. 3;

Fig. 6 is an enlarged fragmentary view, in vertical section, taken on line VI—VI of Fig. 1;

Fig. 7 is a similar view, taken partially on line A—A and partially on line B—B of Fig. 1;

Fig. 8 is a horizontal sectional view, taken on line VIII—VIII of Fig. 6;

Fig. 10 is an enlarged vertical sectional view of a portion of one of the hollow heating walls and certain of its associated parts;

Fig. 11 is a view in elevation of a portion of a wall actuating mechanism and certain of the associated walls, parts being broken away; and Fig. 12 is an enlarged fragmentary plan view of the wall actuating mechanism.

Figure 1:
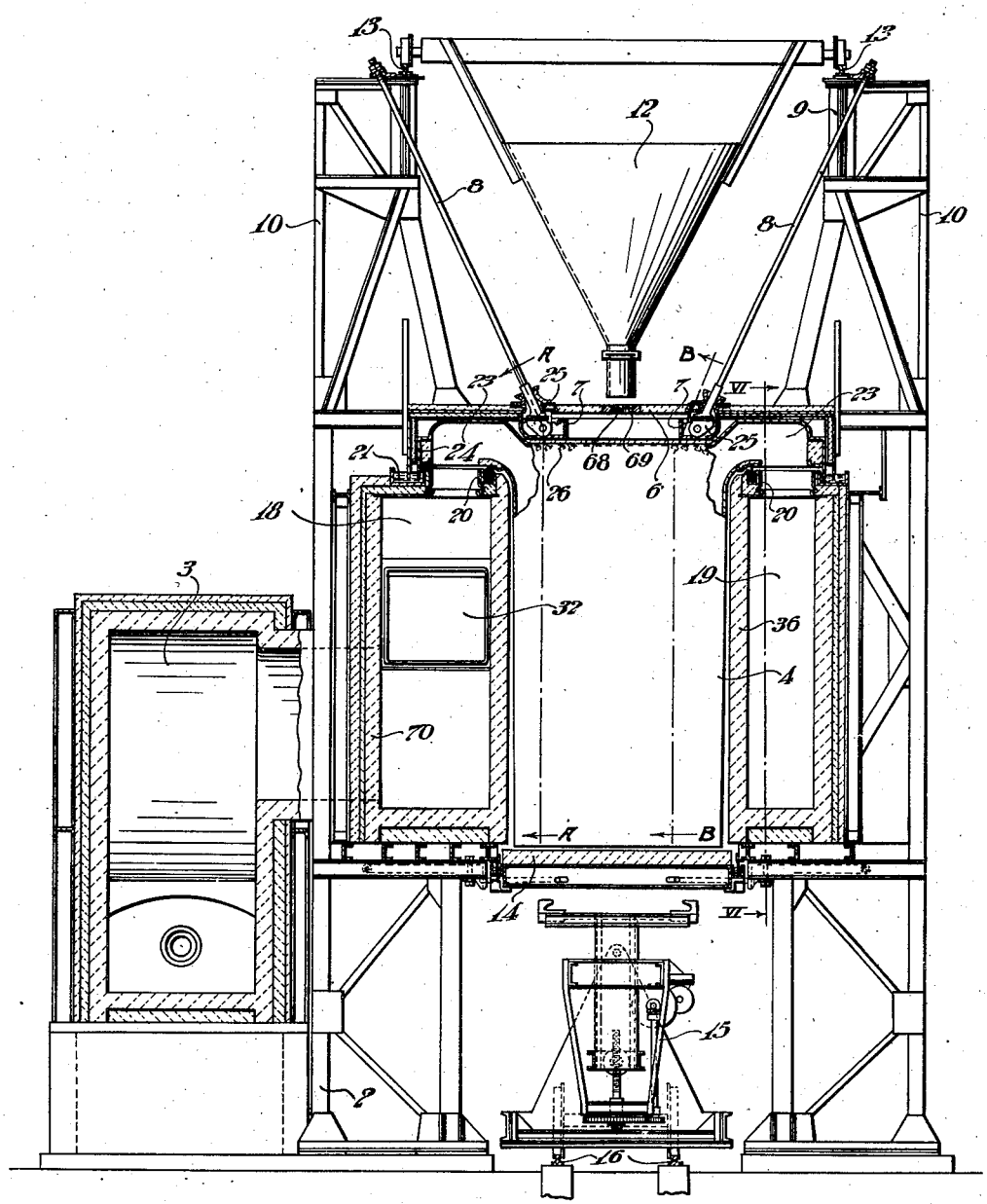

Referring to the drawings, coking apparatus constructed in accordance with my invention comprises a substantially rectangular housing 1 of suitable refractory material and which is supported upon structural framework 2. A furnace 3 supplies hot gases to the housing 1 within which are mounted a series of movable hollow hanging heating walls 4.

Figure 2:
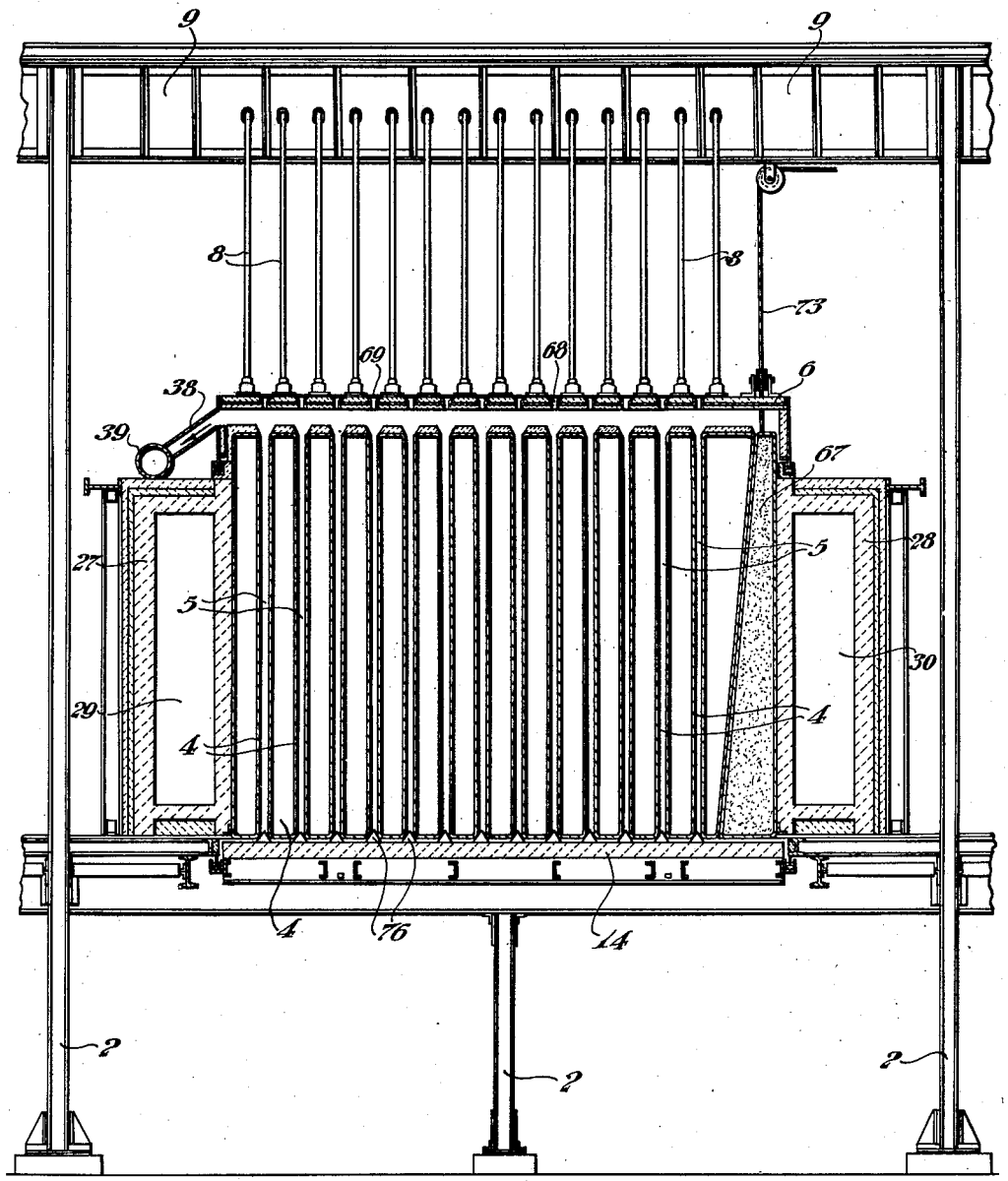
Fig. 2 is a vertical sectional view, taken on line II—II of Fig. 3.
Figure 3:
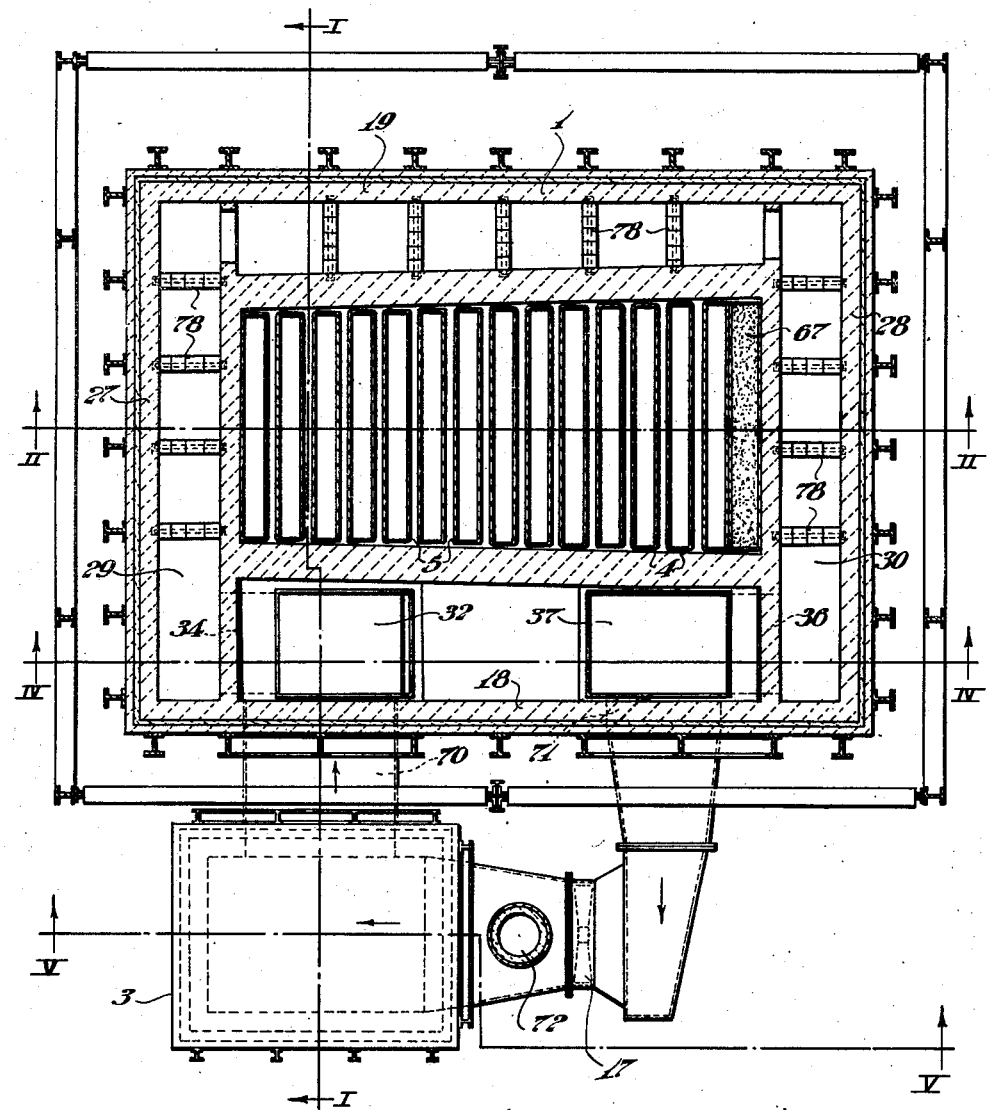
Fig. 3 is a horizontal sectional view, taken on line III—III of Fig. 4.

As best shown in Figs. 2 and 3, the hanging walls 4 are arranged side-by-side and are spaced to provide coking chambers 5 therebetween. The housing 1 is provided with a roof or top 6 that rests on two rows of relatively short beams 7 that are suspended by means of two rows of oppositely inclined pivotally connected hanger rods 8 that extend through the roof 6 and are connected to horizontal girders 9 of framework 10. Coal is supplied to the coking chambers 5 by means of a hopper 12 that is movably mounted on rails 13 on the girders 9.

A bottom closure member 14 for the housing is detachably secured in position and may be removed and replaced as desired by means of a door machine 15, mounted on suitable tracks 16 beneath the closure.

The several side walls of the housing 1 are hollow to provide suitable passageways for the heating gases that are supplied from the furnace 3 and that are circulated through the apparatus by means of a unidirectional fan 17. The hollow side wall 18 adjacent the furnace 3 and the opposite side wall 19 are provided in their upper portions with a series of upwardly projecting rectangular ports 20, which extend from the hollow interiors through a liquid seal 21 that connects the roof 6 to the housing 1 around its entire periphery.

Each of the hanging walls 4 is provided, on each of its opposite sides at the top thereof, with a tubular extension 23 of rectangular cross-section having a downwardly-extending portion 24 for enclosing and telescoping with the ports 20. There is sufficient clearance between these telescoping parts to permit movement of each hanging wall 4 about the axis of two pivotal supports 25 on the beams 7 from which the hanging walls 4 are suspended by means of inclined hanger bolts 26. The details of the connections just described and one of the pivotal supports for a hanging wall 4 are shown in enlarged detail in Fig. 10.

The suspension of the hanging walls 4 by the beams 7 and the oppositely inclined hanger rods 8 places the upper portions of the heating walls 4 under tension and thus prevents their sagging or deformation when heated. The pivotal connection between the hanger rods 8 and the beams 7 permits expansion of the heating walls without varying the direction of the stresses applied thereto.

Figure 4:
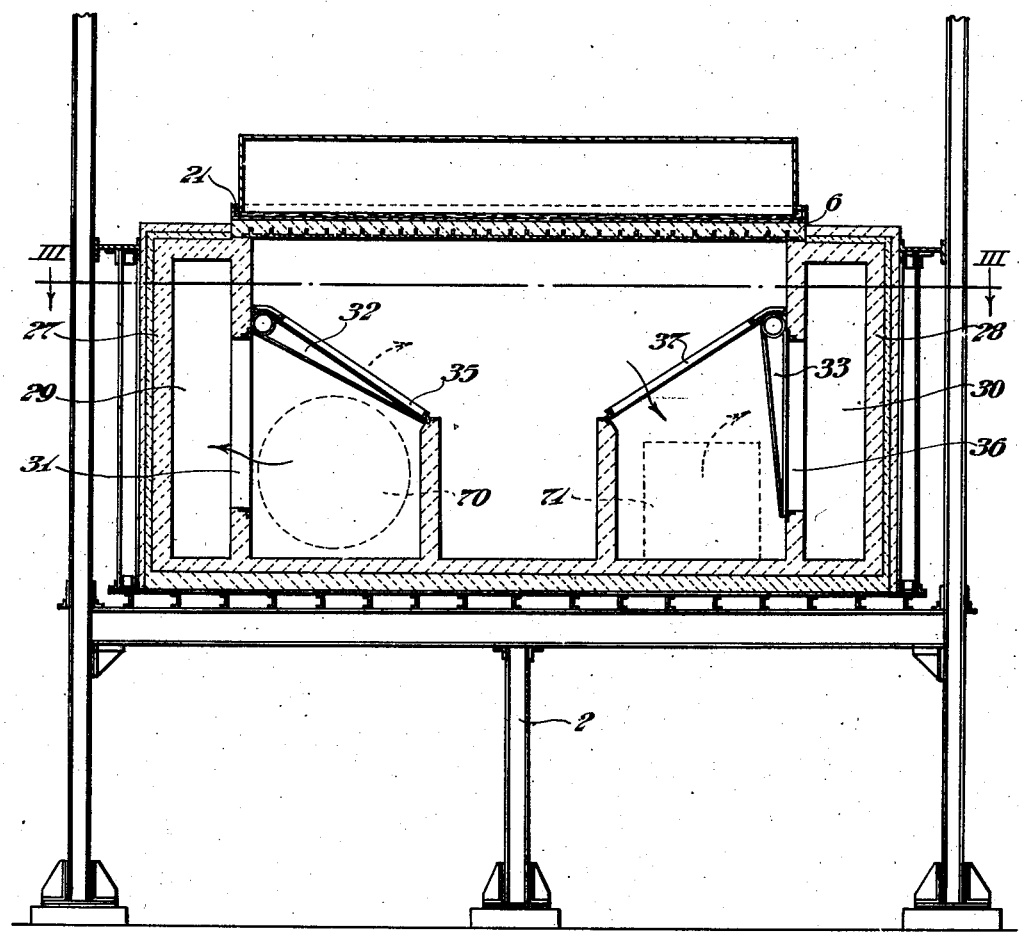
Fig. 4 is a vertical sectional view, illustrating the damper mechanism and taken on line IV—IV of Fig. 3.
Figure 5:
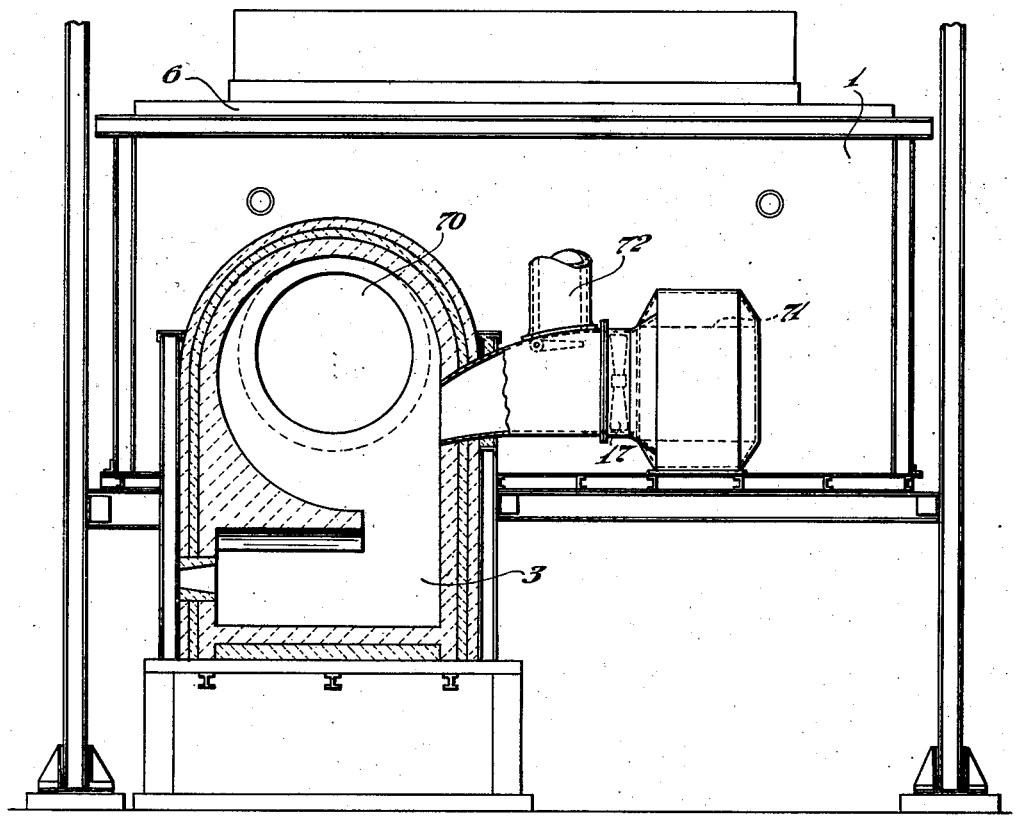
Fig. 5 is a view, partially in elevation and partially in section, along the wall V—V of Fig. 3.

The end walls 27 and 28 of the housing 1 are respectively provided with passageways 29 and 30 which connect the hollow side walls 18 and 19 that are connected in the manner described above to the hanging walls 4. As best shown in Figs. 3 and 4, the direction of gases through the apparatus is controlled by two dampers 32 and 33 located in the side wall 18. The damper 32, in accordance with its position, permits flow of gases through an opening 34 or an opening 35, as the case may be, while the damper 33 controls flow of gases through similar openings 36 and 37.

The principle of operation of the heating system with respect to the dampers is similar to that of the heating system covered by my Patent No. 1,799,702, in which a fan operates in a single direction to actuate heating gases through apparatus to be heated and the direction of flow through the latter is periodically reversed by means of dampers.

Gases of distillation are conducted from the interior of the housing by means of space beneath the roof 6 and between the beams 7 which communicates with a pipe 38 connected to a collecting main 39. Travel of these distillation gases over the water seal is blocked by ribs 41 and 42 on the tubes 23 and by a sand seal 43. A rib 45 attached to the roof 6 projects down into the sand seal 43. Two ribs 46 extend into sand seals 44.

The vertical passage at the left-hand end of the tubular section 23 (Fig. 10) is blocked by an asbestos rope 47 held in place by a U-shaped groove 48 on the end of the tube 23.

Transversely to and between the tubes 23 is a series of slidably engaging sealing members 49 that are in engagement in the various positions of the hanging walls 4 and thereby in conjunction with two sand seals 44 prevent gases from entering the space adjacent the water.

The spaces above these seals are thus separated from the coking chambers and contamination of the seal by precepitation of fine coal dust is prevented. Very small quantities of dust which might possibly enter through the fine cracks at points where the different types of seals connect with each other are prevented from doing so by a light current of steam, which is generated in the seals caused by heating of the water.

A portion of the steam generated in these seals will mix with the heating gases, but another portion has no other outlet than the space above the seals and it escapes through the small cracks between the several dry seals surrounding the tubes 23. The steam while passing through these cracks into the coking chamber will successfully prevent any coal dust from reaching the water seals.

In order to keep the formation of steam down to the desired minimum, the ports 20 are insulated from the heating gases, and the tubes 23 are also insulated on the inside near the seals. In order to avoid the formation of boiler scale in the water seals, which would interfere with the movability of the walls, a quality of water will be used which does not contain solids, and for this purpose water condensed from steam used at the coking plant will be used. Such steam may have previously been used to drive the propeller for recirculation of the heating gases of the retort or any other exhauster or pump.

The water seals have ample width outside of the roof 6 to provide access beneath the lower edge of the roof to the space between the ports and tubes.

Figure 9:
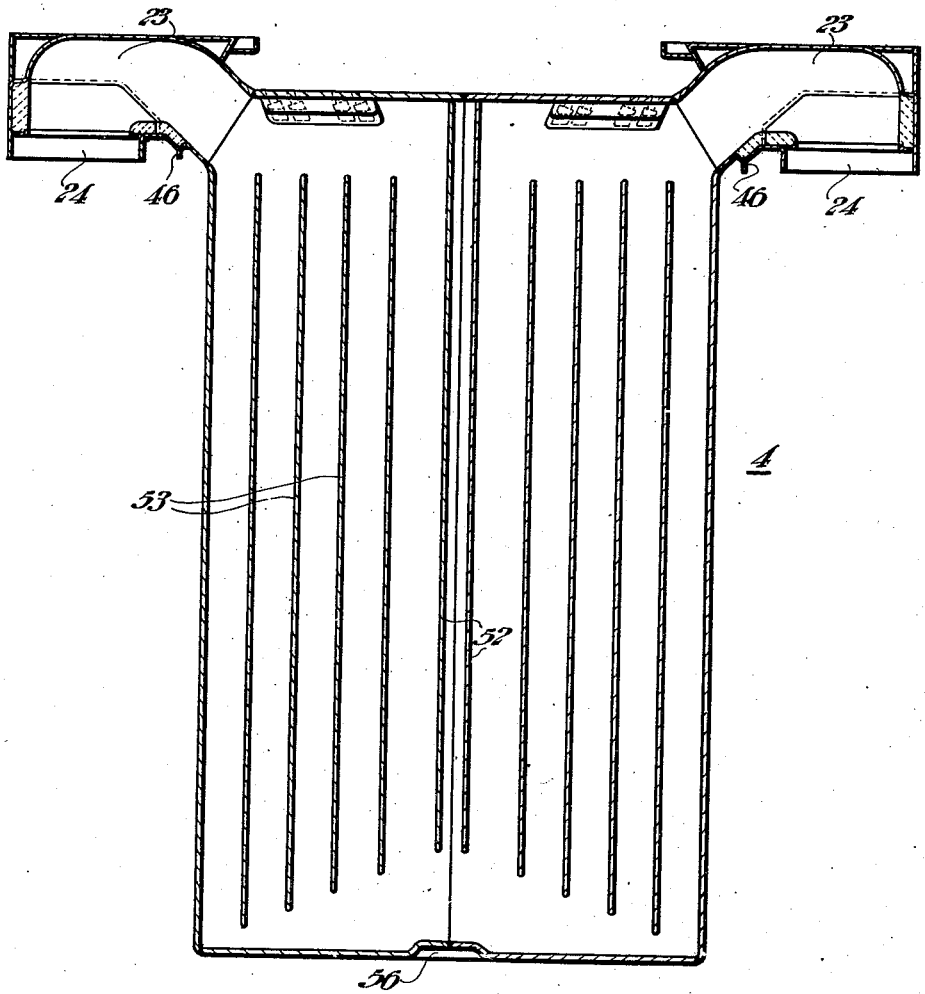
Fig. 9 is an enlarged vertical sectional view of one of the hollow heating walls.

The details of one of the hanging walls are shown in Fig. 9. It will be noted that each hanging wall is provided with two ribs 52 constituting a vertical partition in order to insure that gases entering one of the tubes 23 must pass vertically downward on one side of the partition and return upwardly through the other side and out through the other tube 23.

Each hanging wall is also provided, on its interior, with vertical reinforcing ribs 53 for resisting pressure when the coking chambers 5 are filled with coal.

As shown in Fig. 7, the hanging walls 4 are flared outwardly at the bottoms of their sides for retaining the coke in position until the walls are separated.

As shown in Fig. 1, the clearance between the side walls 18 and 19 and the adjacent edges of the hanging walls 4 increases slightly from top to bottom in order to facilitate removal of the coke. Either the hanging walls 4 or the walls 18 and 19 may be slightly inclined to provide the desired clearance.

The hanger rods 8 are suitably sealed by flexible material to the roof to prevent leakage around the rods.

Reference may now be had to Figs. 11 and 12, in which is illustrated mechanism for separating the hanging walls 4 and for returning them to their operative or coking position. This actuating mechanism, which is carried on the side of a coke car 54, comprises a series of vertical rods or bars 55 that are adapted to engage a recess 56 in the bottom of each of the hanging walls 4. The rods 55 correspond in number to the movable hanging walls, it being noted that the hanging wall 4 on the extreme left, as viewed in Figs. 2 and 3, is stationary.

The bars 55 are controlled by an elevating mechanism 57, which raises and lowers the bars 55 into and out of engagement with the bottoms of the hanging walls 4. The elevating mechanism comprises a motor 58, which operates through suitable gear mechanism 59 and racks 60 to simultaneously raise or lower the bars 55 in accordance with the direction of the motor.

A shifting mechanism 62 comprises a motor 63, gear mechanism 64 and a horizontal rack 65, which operates through cams 66 to separately and successively shift the bottoms of the hanging walls 4 to separate them and thus permit the coke to fall from the several coking chambers 5. When the motor 63 operates in one direction, the hanging walls 4 are successively actuated to the right, as shown in Figs. 2, 3 and 11, and when operated in the other direction, to successively return them to their vertical positions.

It may be assumed that the hanging walls are in their normal or vertical positions, as shown in Figs. 2 and 3, and that a displacement body 67 that is of wedge shape occupies the space at the right of the row of hanging walls 4. It will be noted, also, that the adjacent hanging wall is flared in the opposite direction in order to conform to the outline of the displacement body 67.

The coking chambers 5 are filled by the hopper 12, which is actuated along the rails 13, and discharges through charging openings 68 in a manner usual in the operation of coke ovens. The charging openings are provided with the usual lids 69.

Heating gases are supplied from the furnace 3 through a cylindrical opening 70 in the wall 18 and it may be assumed that the dampers 32 and 33 are in the positions in which they are shown in Fig. 4. Heated gases then flow through the opening 34 into the passageway 29 in the wall 27 and into the hollow side wall 19. The gases then pass upwardly through the ports 20 and tubes 23 in parallel through the several hanging walls 4 and through similar connections downwardly into the hollow side wall 18.

The gases then pass through the opening 37 and outwardly through a duct 71 to the fan 17. A portion of the used heating gases is discharged through a vertical pipe 72 while the remainder is mixed with fresh gases from the furnace 3 and is recirculated.

At the end of preferably short periods, the positions of the dampers 32 and 33 are reversed and gas then flows upwardly through the opening 35 in the side wall 18 and in a reverse direction through the hanging walls 4 into the side wall 19, returning through the passageway 30 and opening 36 into the side wall 18 and out through the duct 71.

When the coking operation has been completed, the door mechanism 15 is actuated into position to engage the bottom closure 14 and the latter is released and removed by the door mechanism from beneath the apparatus. The displacement body 67 is then lowered by means of a cable 73 attached thereto in order to provide space for movement of the hanging walls.

The discharging mechanism is then placed in position in registry with the hanging walls and the latter operates in the manner previously described to successively separate each hanging wall from the adjacent hanging wall until all of the coking chambers 5 have been enlarged to permit the coke to fall therefrom.

It will be noted, as best shown in Fig. 3, that the coking chambers are of decreasing width as they approach the left end of the enclosure. This arrangement facilitates the movement of the hanging walls 4 as they are moved into a slightly wider space upon their actuation to the right.

When the coke has been discharged and the hanging walls 4 have been returned to their normal vertical positions, the displacement body 67 is raised to its uppermost position and the bottom closure is again secured in place. The cycle of operations is then repeated.

The relative positions of the hanging walls 4 are maintained by spacing lugs 75 at the tops of the walls 4 and by projections 76 in the bottom closure 14 which project between the bottoms of the walls 4 when the bottom closure is in position.

As shown in Fig. 3, the hollow walls of the enclosure 1 are reinforced by struts 78 of hollow refractory tile which maintain the proper spacing of the sides of the hollow walls.

The apparatus of my invention possesses a number of advantages, among which are the elimination of the additional space that is ordinarily required to permit relative movement of the hanging walls. Accordingly, the amount of gas that may occupy space within the enclosure is very materially reduced.

The heating of the enclosing walls is also of advantage in that the ends of the coking chambers 5 and the movable walls are maintained at substantially the same temperature as their interior portions because there is no radiation from the ends of movable walls into the distilling chamber, and thus the walls are protected against stresses due to uneven temperatures.

The ends of the hanging walls are so closely adjacent to the side walls of the enclosure that the latter form the ends of the coking chambers and there is substantially no waste space within the enclosure.

All parts of the hanging walls are always under tension by reason of their suspension in the matter described.

The gas connections of the heating walls are located at the tops only and they rise upwardly before they turn downwardly into the water seals, and thus a maximum useful height for coking purposes is obtained. Dust is kept out of the seals and the spaces surrounding the flexible gas connections and these seals are made accessible from outside.

The entire mechanism for spreading the walls is located outside of the retort, away from heat and corrosion and only one of these mechanisms is needed for a number of retorts by virtue of the fact that the mechanism is now attached to the coke car.

By providing the displacement wedge in the reserve space into which the walls are swung it has become superfluous to fill this space with coke, which would be undesirable, due to the cost of handling, heating and cooling such coke. This wedge also takes the pressure of the coal during operation.

The foregoing and other advantages will be apparent to those skilled in the art of construction and operation of coking apparatus.

I claim as my invention:

1. Coking apparatus comprising an enclosure, a plurality of vertical hanging walls substantially parallel to each other within said enclosure on horizontal pivotal supports and spaced from each other horizontally and on substantially the same level to provide coking chambers therebetween, and mechanism suspended from outside said enclosure and having means for engaging said hanging walls for separately and successively moving them about their pivotal supports to vary the widths of said coking chambers.

2. Coking apparatus comprising an enclosure chamber, a plurality of vertical hanging heating walls of metal within said enclosure chamber, means for suspending said walls from points outside the enclosure chambers and without their vertical projection and connected at opposite points to the upper parts of said walls to place said hanging walls under tension to prevent their deformation when heated, said heating walls being substantially parallel to each other and spaced from each other horizontally and on substantially the same level, and being independently hung and movable horizontally toward and away from each other.

3. Coking apparatus comprising an enclosure chamber, a plurality of vertical hanging walls of metal within said enclosure chamber, and outwardly inclined hanging members suspended from outside the enclosure chamber, and means for connecting said members to oppositely disposed top portions of said walls to place the latter under tension to prevent their deformation when heated, said heating walls being substantially parallel to each other and spaced from each other horizontally and on substantially the same level, and being independently hung and movable horizontally toward and away from each other.

4. Coking apparatus comprising a plurality of vertical hanging walls of metal and outwardly inclined hanging members, and means for connecting said members to oppositely disposed top portions of said walls to place the latter under tension to prevent their deformation when heated, said connecting means comprising elements connected to said hanging members and to said hanging walls by pivotal connections respectively at right angles to each other, said heating walls being substantially parallel to each other and spaced from each other horizontally and on substantially the same level, and being independently hung and movable horizontally toward and away from each other.

5. Coking apparatus comprising an enclosure chamber, a plurality of hanging heating walls therein having coking chambers therebetween, and means comprising beams outside said enclosure chamber and suspension means extending therefrom into said enclosure for supporting said walls, said heating walls being substantially parallel to each other and spaced from each other horizontally and on substantially the same level, and being independently hung and movable horizontally toward and away from each other.

6. Coking apparatus comprising an enclosure chamber having the coking means proper inside the same and a roof, means for supporting said roof comprising a plurality of beams within said enclosure beneath said roof, hanger rods extending through said roof and connected to said beams, and a structure outside said enclosure for supporting said hanger rods.

7. Coking apparatus comprising an enclosing chamber, a plurality of heating walls each of which has an internal heating gas flue, said heating walls being arranged in said enclosing chamber substantially parallel to each other and spaced from each other horizontally and on substantially the same level to provide coking chambers therebetween, said heating walls being independently hung and movable horizontally toward and away from each other and being mounted for pivotal movement about a horizontal axis at their upper parts in the enclosing chamber for said movement for discharge of coke from the coking chambers, a removable wedge adapted to take up the space required for shifting the heating walls for discharge of the coking chambers and removable to permit the heating walls to be moved to and from each other, two main heating-gas conveying conduits exterior to said enclosing chamber and extending on opposite sides thereof transversely of said heating walls, and flexible gas-tight heating-gas connections individual to the respective heating walls communicably connecting the flue of each of the heating walls with the two main heating-gas conveying conduits at the upper parts of the heating walls.

8. Coking apparatus comprising an enclosure chamber, a plurality of hanging heating walls having coking chambers therebetween, said heating walls and coking chambers being wholly within said enclosure chamber, means comprising a set of oppositely disposed beams entirely outside said enclosure chamber and the walls forming the same and suspension rods extending between and connecting said beams and the hanging heating walls for supporting said walls, a charging mechanism for said coking chambers and rails on the set of oppositely disposed beams from which the heating walls are suspended for movably supporting said charging mechanism, said heating walls being substantially parallel to each other and spaced from each other horizontally and on substantially the same level, and being independently hung and movable horizontally toward and away from each other, said charging mechanism depending between said suspension rods from a wheel carriage hung from said rails.

9. Coking apparatus comprising an enclosing chamber, a plurality of heating walls each of which has an internal heating-gas flue, said heating walls being arranged in said enclosing chamber substantially parallel to each other and spaced from each other horizontally and on substantially the same level to provide coking chambers therebetween, said heating walls being independently hung and movable horizontally toward and away from each other and being mounted for pivotal movement about a horizontal axis at their upper parts in the enclosing chamber for said movement, two main heating-gas conveying conduits exterior to said enclosing chamber and extending on opposite sides thereof transversely of said heating walls, and flexible gas-tight heating-gas connections individual to the respective heating walls communicably connecting the flue of each of the heating walls with the two main heating-gas conveying conduits at the upper parts of the heating walls.

10. Apparatus as claimed in claim 9 and in which each of the heating gas connections comprises a flexible connection comprising a duct dipping into an annular cup adapted to contain a liquid and providing therewith means for a liquid seal.

11. Apparatus as claimed in claim 9 and in which the movable heating walls are suspended at their upper ends in such manner that they can be swung around a horizontal axis located at a level adjacent the level of their heating gas connections.

FRANZ PUENING.